United States Patent [19]

Shimada et al.

[11] 4,449,204

[45] May 15, 1984

[54] INFORMATION PROCESSING APPARATUS USING A SEMICONDUCTOR LASER DIODE

[75] Inventors: Junichi Shimada; Yoshinobu Mitsuhashi; Kenjiro Sakurai; Takitaro Morikawa, all of Ibaragi; Shuichi Mitsuzuka, Toda, all of Japan

[73] Assignees: Agency of Industrial Science and Technology; Ministry of International Trade and Industry, both of Tokyo, Japan

[21] Appl. No.: 248,211

[22] Filed: Mar. 27, 1981

[30] Foreign Application Priority Data

Mar. 31, 1980 [JP] Japan ................................. 55-40397

[51] Int. Cl.³ ............................................ G11C 13/08
[52] U.S. Cl. .................................... 365/127; 365/121
[58] Field of Search ........................ 365/120, 121, 127

[56] References Cited

U.S. PATENT DOCUMENTS 3,919,698 11/1975 Bricot et al. ........................ 365/127
4,105,926 8/1978 Reno et al. ......................... 365/127

OTHER PUBLICATIONS

Fleisher et al., "Mechanisms for Reading a Standing Wave Memory Simultaneously and Independently", IBM Tech. Dics. Bull., vol. 16, No. 10, 3/64, pp. 108-109.

Buhrer et al., "Electrooptic Effect in Optically Active Crystals," Applied Optics, 4/64, vol. 3, No. 4, pp. 517-521.

Wireless World, "Without Doubt the Video Disc is not the end of the Story", 7/76, vol. 82, No. 1487, pp. 30-31,36.

Harris "Optical Memory Readout Apparatus", IBM Tech. Disc. Bul., vol. 7, No. 12, 5/65, p. 1199.

Rutz, "Integrated Mark Sensing Device", IBM Tech. Disc. Bul., vol. 9, No. 7, 12/66, p. 934.

Primary Examiner—Stuart N. Hecker
Attorney, Agent, or Firm—Oblon, Fisher, Spivak, McClelland & Maier

[57] ABSTRACT

An optical information processing apparatus comprises an information recording medium, a semiconductor laser diode for issuing a laser beam and an optical system adapted to direct the issued laser beam from the semiconductor laser diode toward the information recording medium and then return the reflected laser beam from the medium to the diode and provided with means capable of rotating the plane of polarization of the reflected laser beam from the medium by 90° relative to the plane of polarization of the issued laser beam.

4 Claims, 8 Drawing Figures

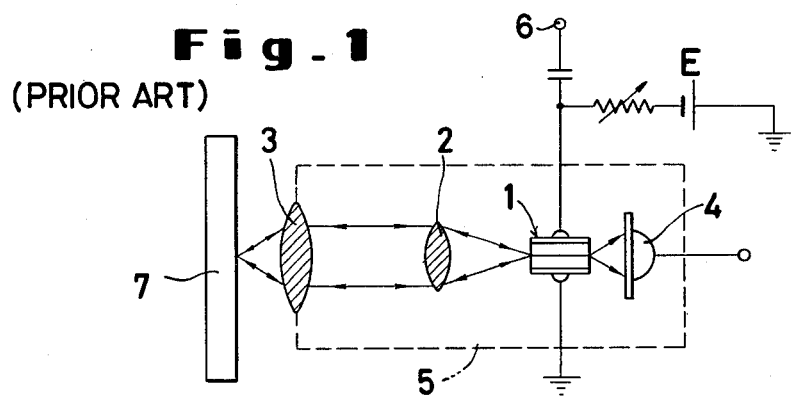
Fig_1 (PRIOR ART)
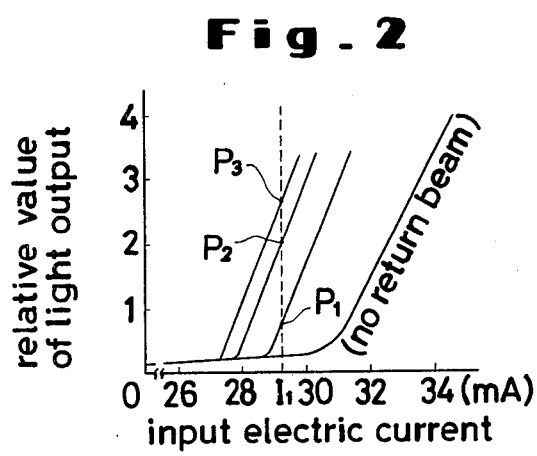
Fig_2
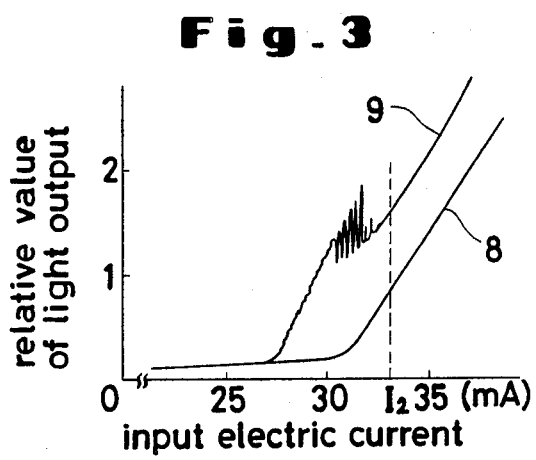
Fig_3
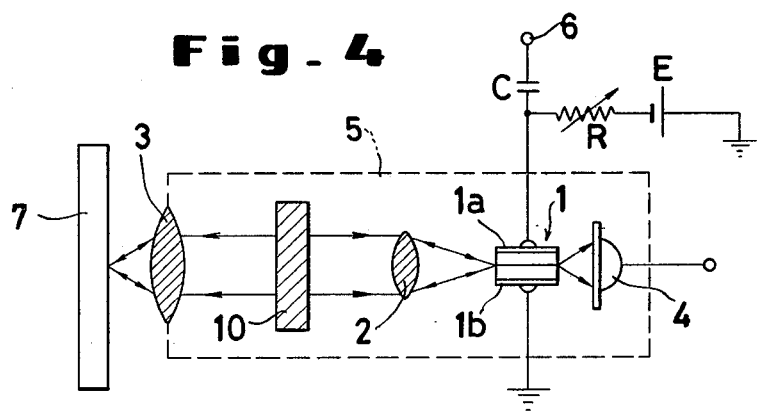
Fig_4
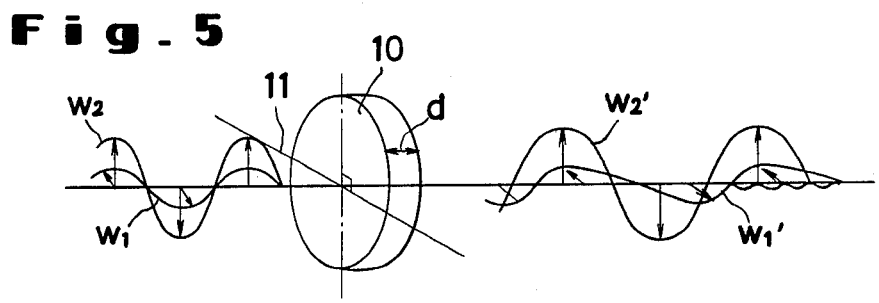
Fig_5

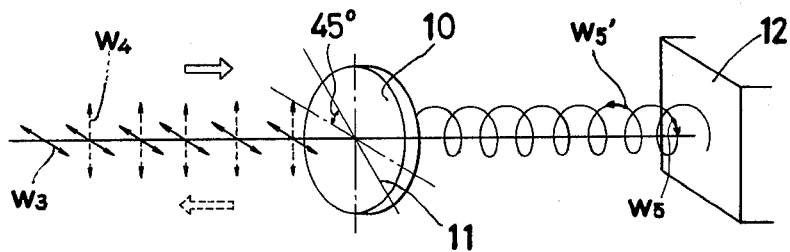
Fig_6
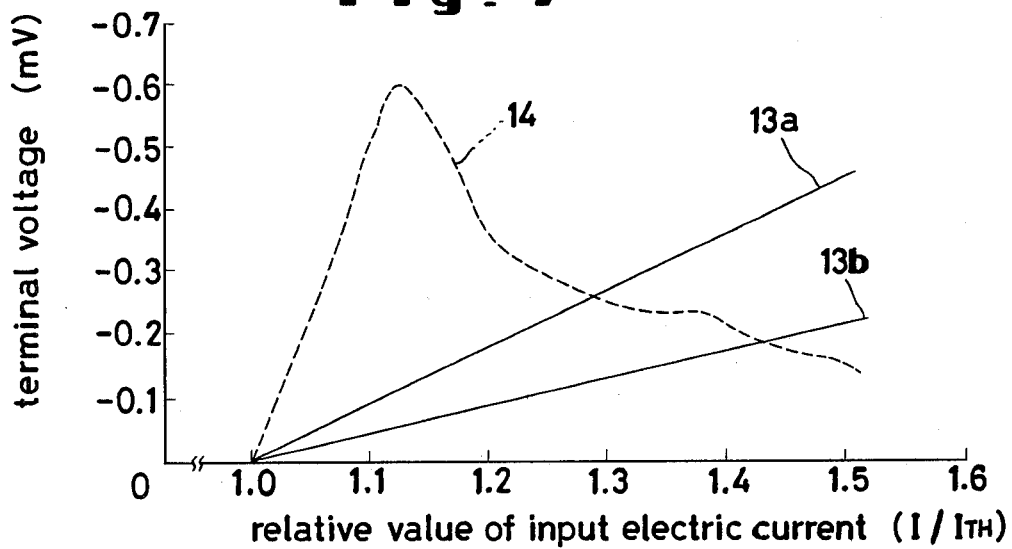
Fig_7
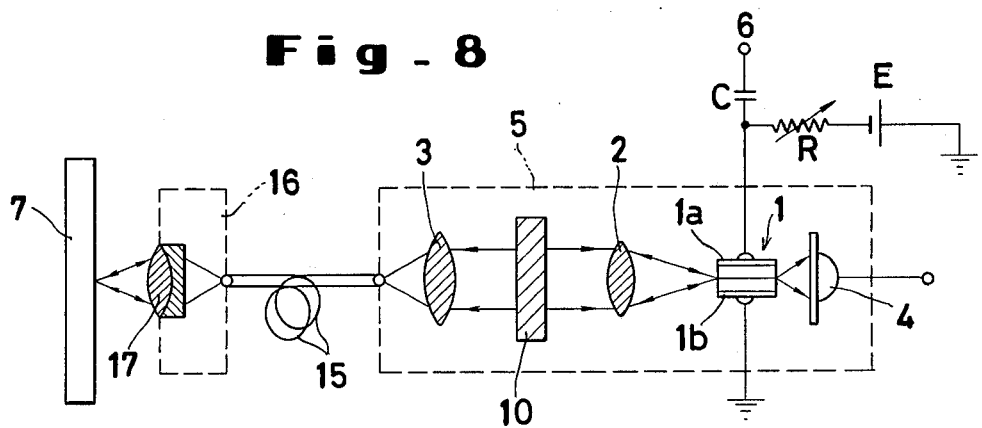
Fig_8

INFORMATION PROCESSING APPARATUS USING A SEMICONDUCTOR LASER DIODE

BACKGROUND OF THE INVENTION

1. Field of the Invention

This invention relates to an optical information processing apparatus adapted to effect reproduction of information from an information recording medium by projecting a laser beam issuing from a semiconductor laser diode onto the information recording medium, causing the reflected laser beam to return to the semiconductor laser diode and detecting the variations in the characteristic property of the information recording medium from the variations in the returned laser beam.

2. Description of the Prior Art

Recently, optical information processing apparatuses utilizing various forms of optical discs such as video discs otherwise called "picture-producing records," PCM audio discs and optical memories for business use have been developed. These optical information processing apparatuses are intended to effect reproduction of information, for example, from information recording media such as optical discs by projecting a laser beam or some other beam onto the information recording media and deriving the information in the form of variation in the intensity of the reflected laser beam.

As is well known, a minute electroluminescent semiconductor device on the hundred micron order is commercially available. Early electroluminescent semiconductor devices of this type were not capable of continuously operating without being kept at a very low temperature. Recently available devices, however, can operate continuously at room temperature. U.S. Pat. No. 3,812,477 teaches that such a minute semiconductor laser can be used to read bits of information from a compact-storing memory with a high resolution.

According to the method of the U.S. patent a three mirror laser system is used, which comprises a semiconductor laser and a reflector bearing bits of information, and arranged on the optical axis of the semiconductor laser. With this arrangement a resonator system is composed of the semiconductor laser and the reflector, and the reflectivity of the reflector varies depending on whether it bears a bit of information or not. Thus the oscillation of the laser starts and stops depending on whether the laser beam is directed to a recorded bit of information or not and the existence of a bit of information is, conversely, detected from the state of the laser.

In such a system, the lasing of the laser is also started and stopped by wavelength order changes in the length of the optical path.

Further, part of the present inventors have suggested a small readout apparatus which operates by use of the self-coupling effect of the semiconductor laser element (U.S. Pat. No. 4,190,775).

Recently, although the characteristic properties of semiconductor lasers have been notably improved and the degree of the coherence has been enhanced, they entail a new problem in that their operations as self-coupled optical pickups have become unstable.

SUMMARY OF THE INVENTION

An object of this invention is to provide an information processing apparatus which is capable of suppressing the self-coupled effect in the semiconductor laser diode and accurately obtaining from the information recording medium a terminal voltage corresponding to the reflected beam from the information recording medium. To accomplish the object described above according to the present invention, there has been provided an optical information processing apparatus which is adapted to project a laser beam issuing from a semiconductor laser diode onto an information recording medium through an optical system and return the reflected beam from the information recording medium back to the aforementioned semiconductor laser diode again through the aforementioned optical system. Further, the apparatus interposes a $\lambda/4$ plate ($\lambda$ representing the wavelength of the outgoing laser beam) within the aforementioned optical system and, with the aid of this $\lambda/4$ plate, rotates the plane of polarization of the aforementioned reflected beam by 90° relative to the plane of polarization of the aforementioned outgoing beam and permits detection of the variation in the terminal voltage in the aforementioned semiconductor laser diode corresponding to the variation in the reflected beam. The self-coupling effect otherwise manifested in the semiconductor laser diode is suppressed by thus rotating the plane of polarization of the return beam en route to the element by 90°. Consequently, the variation in the terminal voltage of the diode faithfully corresponds to the variation in the characteristic property of the information recording medium.

The other objects and characteristics of the present invention will become apparent from the further disclosure of the invention to be given hereinbelow with reference to the accompanying drawing.

BRIEF DESCRIPTION OF THE DRAWING

FIG. 1 is a structural diagram illustrating one embodiment of the conventional information processing apparatus.

FIG. 2 is a characteristic diagram of the light output as a function of the input electric current in the semiconductor laser element used in the processing apparatus of FIG. 1.

FIG. 3 is a characteristic diagram of the light output as a function of the input electric current as obtained in a semiconductor laser element of improved characteristics.

FIG. 4 is a structural diagram illustrating one embodiment of the optical processing apparatus of the present invention.

FIG. 5 is a perspective view of a typical $\lambda/4$ plate to be used in the apparatus of FIG. 4.

FIG. 6 is an explanatory diagram illustrating the plane of polarization of the incident beam and that of the return beam as obtained when the aforementioned $\lambda/4$ is interposed in the path of the beam.

FIG. 7 is a characteristic diagram illustrating the variation in the terminal voltage as a function of the input electric current in the processing apparatus of FIG. 4.

FIG. 8 is a structural diagram illustrating another embodiment of the optical processing apparatus according to the present invention.

DESCRIPTION OF PREFERRED EMBODIMENT

This invention relates to an improvement in and concerning the aforementioned formerly proposed information readout apparatus utilizing a semiconductor laser as a combination light source and sensor. First, this information readout apparatus will be described in outline with reference to the diagram of FIG. 1.

As illustrated in FIG. 1, two lenses 2, 3 are disposed on the front outgoing beam side of the semiconductor laser diode 1 and an information recording medium (optical disc) 7 is disposed at the focal point of the lens 3. A beam detector 4 for sensing the rear outgoing beam is disposed on the rear outgoing beam side of the semiconductor laser diode 1. The semiconductor laser diode 1, the lenses 2, 3 constituting the optical system and the beam detector 4 are encased in a cartridge-like housing 5.

When the electric current from a power source E is injected to the semiconductor laser diode 1, the diode issues laser beams from the front and rear output sides. The front outgoing beam is converged by the lenses 2, 3 and projected on the information recording medium 7. The beam reflected by the medium is passed through the same lenses 2, 3 and returned to the diode 1 now issuing the laser beams.

At this point, the so-called return beam induces a self-coupling effect in the semiconductor laser diode 1 and produces variations in the optical output, terminal voltage, etc. The variation in the voltage is detected by a detector (not shown) connected to a detection terminal 6.

FIG. 2 illustrates a typical variation in characteristics due to the self-coupling effect mentioned above, in the form of a characteristic diagram of the relation between the input electric current and the light output, with the reflectance of laser beam on the information recording medium 7 as the parameter. Though the electric current of a fixed value is injected to the semiconductor laser diode, the value of the light output varies depending on the variation in reflectance. For example, when the value of the input electric current is fixed at $I_1$, the light outputs in the reflectance values of 11%, 50% and 90% vary as represented by $P_1$, $P_2$ and $P_3$ respectively in FIG. 2. By detecting this variation in the light output in the beam detector 4 by means of the rear outgoing beam, therefore, the information recorded in the information recording medium 7 can be read out.

The terminal voltage likewise varies depending on the variation in reflectance. Thus, the readout of the information can also be effected by the detection of the change in the terminal voltage through the detector terminal 6.

During the aforementioned readout of information, if the rotation of the optical disc, namely the information recording medium 7, entails in-plane vibration or axial deflection, this phenomenon obstructs accurate focusing of beam and consequently interferes with the reproduction of information. As a servo control technique for curbing such trouble, there has heretofore existed a popular practice of wobbling the housing 5 in the apparatus of FIG. 1 thereby vibrating the converging beam in the longitudinal and lateral directions and utilizing the resultant reflected beam as the control signal.

Remarkable improvements have been made recently in various properties of semiconductor laser elements such as elongation of service life and enlargement of light output. Further, single vertical mode oscillation has made possible a major improvement in the degree of coherence.

It should be noted that the aforementioned laser element used in the conventional readout apparatus is of a multi-mode oscillation type which relies for the readout of information upon the variation in the characteristics of the semiconductor due to the variation in the intensity of the return beam.

The improvements described above also help improve the overall performance of the optical information processing apparatus in which they are used. Unfortunately, the improvement in the degree of the coherence, has led to the following adverse effect on the performance of the optical information processing apparatus.

In the characteristic diagram of FIG. 3, plotting the light output as a function of the input electric current, the characteristic curve 8 involving no return beam possesses linearity, whereas the characteristic curve 9 involving the return beam reveals non-linearity of the light output. This non-linearity is similarly caused by a variation in the intensity of return beam or by fine phase variation in the return beam owing to the aforementioned wobbling. This phenomenon poses a problem regarding the reproduction of information or the production of servo signals.

As one possible solution to this problem, there may be conceived an idea of selecting, as the point of operation, the magnitude of input electric current incapable of producing the light output in non-linear form (such as the value of $I_2$ indicated in FIG. 3, for example).

In this case, however, the value of input electric current approximating the threshold value which is particularly effective in enhancing the light output by dint of the return beam can not be selected as the point of operation. For this deficiency, the measure fails to offer a thorough solution of the problem standing in the way of constructing an information processing apparatus.

In the circumstance, the present invention aims to provide an optical information processing apparatus, which gives a perfect solution to the aforementioned problem by interposing a $\lambda/4$ plate ($\lambda$ denoting the wavelength of the issued laser beam) in the optical system, causing the plane of polarization of the reflected beam (return beam) to be rotated by 90° relative to the plane of polarization of the outgoing laser beam, utilizing the reflected beam from curbing the self-coupling effect in the semiconductor laser diode, and using the variation in the terminal voltage such as for the reproduction of information.

Specifically, this invention has been accomplished on the basis of the discovery of the following phenomenon.

When a $\lambda/4$ plate was interposed in the path of the outgoing laser beam from the semiconductor laser diode for the purpose of causing the plane of polarization of the reflected beam (return beam) from the information recording medium, for example, to be rotated by 90° and allowing the rotated beam to return to the semiconductor laser diode, the conventionally observed self-coupling effect such as enhancement of light output was suppressed and, instead, the variation of the terminal voltage was observed to ensue. It was further observed that this terminal voltage varied linearly relative to the input electric current. This particular property turned out to be highly useful such as for the reproduction of information.

Now, the present invention will be specifically described below with reference to the illustrated embodiment.

FIG. 4 illustrates one embodiment of the present invention. The semiconductor laser diode issues a laser beam of a single vertical mode. The distance of the beam's coherence is more than 1 m, for example. The element to be used herein is required to excel in its degree of linear polarization.

On the front outgoing beam side of the semiconductor laser diode 1, an optical system composed of two lenses 2, 3 is disposed. On the rear outgoing beam side, an optical detector 4 is disposed. This optical detector 4 is used as the monitor for the light output of the semiconductor laser diode 1.

The power source E is connected to the two electrodes 1a, 1b through the medium of a variable resistor R adapted for regulation of the electric current. From the electrode 1a, detection terminal 6 capable of sensing the variation in voltage is led out via a condenser C adapted to prevent the flow of direct current.

The present invention further incorporates a $\lambda/4$ plate 10 in the optical system in addition to the construction described above.

The semiconductor laser diode 1, the two lenses, 2, 3 constituting the optical system, the $\lambda/4$ plate and the optical detector 4 mentioned above are collectively encased in the housing 5 of the shape of a cartridge.

The optical elements such as the lenses 2, 3 and the $\lambda/4$ plate have their surfaces coated with a film capable of precluding possible reflection of the issued laser beam from the semiconductor laser diode 1. This particular coating goes to improve the S/N factor during the reproduction of information signals, for example.

Now, the aforementioned $\lambda/4$ plate 10 will be described in detail with reference to FIGS. 5 and 6.

The $\lambda/4$ plate 10 is formed by cutting to a stated thickness d substance which possesses the property of double refraction such as mica, crystal or quartz. This thickness d is determined so that when a beam $w_1$ polarized in the same direction as the optical axis 11 and a beam $w_2$ polarized in the direction perpendicular to the optical axis 11 are injected as illustrated in FIG. 5, a phase difference of 90° (equalling one quarter of the wavelength) appears between the two beams $w_1'$ and $w_2'$ which have passed through this $\lambda/4$ plate. This plate may be formed in the shape of a small disc 5 mm in aperture diameter and about 1 mm in thickness, for example.

Subsequently, the $\lambda/4$ plate 10 formed as described above is disposed with the optical axis 11 thereof rotated by 45° relative to the plane of polarization of the incident beam $w_3$ as illustrated in FIG. 6. Additionally, a reflecting mirror 12 is disposed on the rear surface side of the $\lambda/4$ plate 10 at a proper distance from the plate. In this setup, when the incident beam $w_3$ passes through the $\lambda/4$ plate 10, it is temporarily converted into a polarized beam $w_5$. It is then reflected by the reflecting mirror 12 and, consequently, converted into a reversely rotated circular polarized beam $w_5'$ returned again to the $\lambda/4$ plate 10 side. When this circular polarized beam $w_5'$ passes through the $\lambda/4$ plate 10 from the rear surface side, the plane of polarization of the reflected beam $w_4$ passing through the $\lambda/4$ plate is rotated by 90° relative to the plane of polarization of the incident beam $w_3$, with the result that the planes of polarization of the two beams intersect each other perpendicularly.

The optical information processing apparatus which is one embodiment of the present invention is constructed as described above. When this apparatus is put into operation by forwarding the input electric current from the power source E to the semiconductor laser diode 1, this semiconductor laser diode 1 issues a laser beam of a single vertical mode excelling in degree of polarization. The outgoing laser beam possesses a wavelength on the order of 860 nm, for example.

Of the laser beam issued from the diode 1, the front laser beam is collimated by the lens 2 and injected toward the $\lambda/4$ plate 10. At this point, the incident beam is temporarily converted into a circular polarized beam by means of the $\lambda/4$ plate 10, then converged by the lens 3 and projected to the information recording medium 7.

Subsequently, the reflected beam which has been modulated in accordance with the information signal recorded in the information recording medium 7 is caused to advance in the reverse direction along the same path as followed by the incident beam, and finally returned to the semiconductor laser diode 1. When the reflected beam mentioned above passes through the $\lambda/4$ plate 10 from the rear surface side, the plane of polarization of the reflected beam is rotated by 90° relative to the plane of polarization of the incident beam (outgoing laser beam). It is the reflected beam of this rotated plane of polarization that is returned to the semiconductor laser diode 1.

This return beam (reflected beam) does not produce the phenomenon of self-coupling effect heretofore observed in the conventional countertype of the semiconductor laser diode 1 and, instead, a variation in the terminal voltage corresponding to the variation in the intensity of the return beam is caused. The information processing apparatus of the present invention effects the reproduction of recorded information by extracting the variation in the terminal voltage via the detection terminal 6.

This phenomenon of the variation in the terminal voltage, it is believed, is ascribable to the effect of photo-electric conduction by the return beam.

It may be added in this respect that the terminal voltage extracted through the detection terminal 6 is a signal voltage of a frequency corresponding to the modulated frequency of the return beam.

FIG. 7 illustrate typical curves of the characteristics mentioned above. Specifically, the diagram represents the characteristics of the absolute value of the variation in the terminal voltage as a function of the relative value of the input electric current (normalized to the threshold value), with the reflectance of the beam from the information recording medium 7 used as the parameter. The characteristic curve 13a represents the data obtained for the reflectance of 100% and the characteristic curve 13b those obtained for the reflectance of 50%.

The value of the variation in the terminal voltage is amply high, reaching the order of some mV's. As is evident from the characteristic curves indicated, the magnitude of the terminal voltage varies linearly with the variation in the input electric current without involving any discernible point of operational instability. Thus, the characteristics are perfectly suitable for the purpose of the reproduction of information.

This invention, when embodied as an information processing apparatus, fulfills its function such as in the reproduction of information by utilizing the variation in the terminal voltage which corresponds to the variation in the reflectance for a fixed value of the input electric current.

In the characteristic diagram of FIG. 7, the characteristic curve 14 representing the data obtained by the conventional apparatus not incorporating the $\lambda/4$ plate in the optical system is additionally illustrated for the purpose of comparison. In the apparatus not incorporating the $\lambda/4$ plate, the so-called self-coupling effect occurs to complicate the feature of the characteristic curve of the variation in the terminal voltage. This characteristic cannot be called suitable for the reproduction of information.

FIG. 8 illustrates another embodiment of the present invention. In this embodiment, a single mode optical fiber 15 adapted for preservation of polarization is interposed in the path of the outgoing laser beam drawn out of the lens 3 within the housing 5 and a lens system 17 is additionally disposed at a detection terminal 16 in the leading portion of the optical fiber 15, whereby the outgoing laser beam is projected through this lens system 17 onto the information recording medium 7.

This embodiment allows the further reduction in the size of the detection terminal 16 and providing flexibility in the selection of the position for the attachment of the detection terminal 16.

It should be noted that in the two embodiments illustrated in FIG. 4 and FIG. 8, the housing 5 may be wobbled when necessary similarly to the conventional apparatus.

The optical information processing apparatus of this invention can be extensively adopted in various manners for the detection of signals from optical memory readout apparatuses and from rotary encoders and for the detection of the rate of rotation of the rotary disc in an electrodynamometer, for example.

As described in detail above, this invention has the λ/4 plate interposed in the optical system and, by means of this plate, enables the plane of polarization of the reflected beam from the information recording medium to be rotated by 90° relative to the plane of polarization of the issued laser beam and then returned to the semiconductor laser diode. Consequently, the apparatus of the present invention is capable of curbing the self-coupling effect heretofore observed in the conventional apparatus. It further involves detection of the variation of terminal voltage which originates in a novel effect. This variation in the terminal voltage manifests a stable characteristic suitable for the purpose of the reproduction of information. Moreover, the variation in the terminal voltage has a magnitude large enough for practical use in the reproduction of information. The present invention, therefore, solves the problem entailed by the improvement of characteristics of the semiconductor laser element and brings about an advantage of providing an optical information processing apparatus of outstanding practical utility.

Since the λ/4 plate itself can be formed in a small size, the optical information processing apparatus of this invention which additionally incorporates this λ/4 plate can be formed in substantially the same size as the conventional apparatus. Also in this respect, this invention manifests excellent practical utility.

What is claimed is:

1. In an optical information processing apparatus comprising an information recording medium, means including a semiconductor laser diode, a current input means and a terminal voltage detector means adapted to issue a laser beam and an optical system adapted to direct the laser beam from the laser diode toward the information recording medium, and then return the reflected laser beam from said information recording medium to said semiconductor laser diode, the improvement wherein said optical system is provided with a λ/4 plate capable of rotating the plane of polarization of the reflected beam from said recording medium by 90° relative to the plane of polarization of the issued laser beam, thereby permitting a variation in the terminal voltage input to said detector means which corresponds to the variation in the intensity of the reflected beam being detected by said semiconductor diode and which is linearly related to the output of said current input means.

2. The optical information processing apparatus according to claim 1, wherein said λ/4 plate for rotating the plane of polarization of the reflected beam by 90° relative to the plane of polarization of the issued laser beam is made up of a substance possessed of a double refraction property and cut to a stated thickness.

3. The optical information processing apparatus according to claim 2, wherein the substance possessed of a double refraction property is one member selected from the group consisting of mica, crystal or quartz.

4. The optical information processing apparatus according to claim 1, further comprising an optical fiber of single mode between said optical system and said information recording medium, which optical fiber is capable of preserving polarization.

* * * * *